April 12, 1966   R. S. WILKES   3,245,516
ADJUSTABLE LIVESTOCK FEEDER
Filed Oct. 2, 1964   2 Sheets-Sheet 1
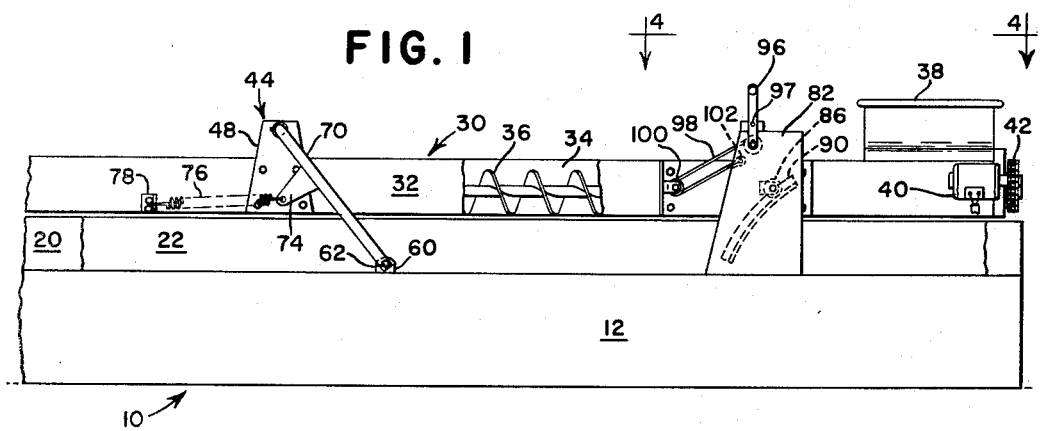
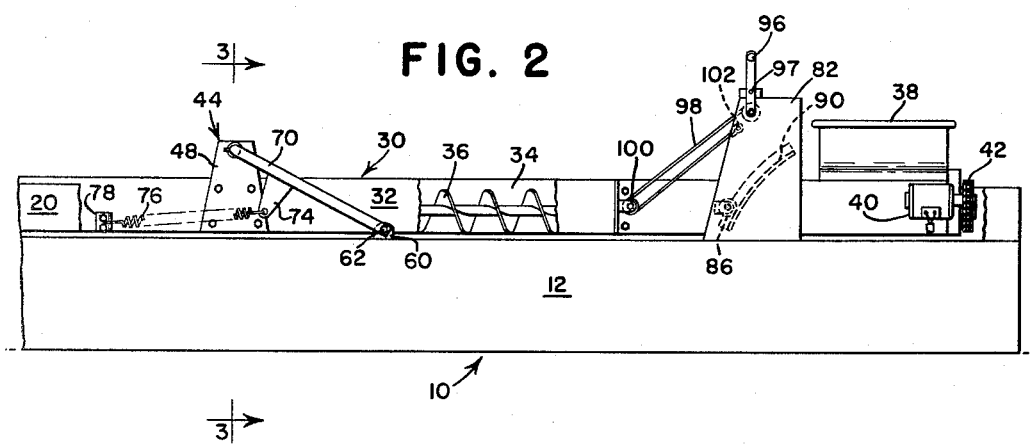
*INVENTOR.*
RAYMOND S. WILKES
BY *John M. Nolan*
ATTORNEY April 12, 1966     R. S. WILKES     3,245,516
ADJUSTABLE LIVESTOCK FEEDER Filed Oct. 2, 1964     2 Sheets-Sheet 2

*INVENTOR.*
RAYMOND S. WILKES

BY John M Nolan

ATTORNEY

United States Patent Office 3,245,516
Patented Apr. 12, 1966

3,245,516
ADJUSTABLE LIVESTOCK FEEDER
Raymond S. Wilkes, Moline, Ill., assignor to Deere & Company, Moline, Ill., a corporation of Delaware
Filed Oct. 2, 1964, Ser. No. 401,163
15 Claims. (Cl. 198—64)

This invention relates to a material conveying and distributing device and more particularly to a livestock feeder having a conveyor with a conveyor feeding hopper at the end of the feeder and a structure for vertically adjustably supporting the conveyor including spring means to facilitate raising the conveyor.

As described in copending U.S. patent application Ser. No. 343,784, filed February 10, 1964, a conventional livestock feeder includes an elongated bunk and a longitudinal conveyor to move the feed from a hopper at one end of the bunk and distribute it along both sides of the bunk. One type of conveyor, as described in said application, includes an auger disposed between upright retaining walls. As further described in said application, it is desirable to have such a conveyor vertically adjustable relative to the bunk floor, various suspension devices being disclosed for raising the conveyor in a longitudinal vertical arc in response to a longitudinal force applied to the conveyor. Various means of supplying this longitudinal force have previously been proposed including winch means at the hopper end of the conveyor and a longitudinal turn screw also applying its force to the end of the conveyor. However, since these devices are located at the end of the conveyor and hopper, and utilize a substantial amount of space, it is impossible to position the hopper end of the conveyor immediately adjacent to a vertical structure with the feed bunk extending transversely from the structure. Since it is often desirable to have the hopper closely adjacent to a silo or a grain bin to facilitate loading the hopper, it is a disadvantage to have the raising device at the end of the conveyor.

The present invention overcomes this objection by locating the device for raising and lowering the conveyor between the ends of the conveyor and positioning the hopper at the end of the bunk.

As also described in copending U.S. patent application Ser. No. 343,784, it is desirable that means be provided to aid the raising of the conveyor since it is relatively heavy, especially in the larger installations. The application discloses the use of helical compression springs between the bunk floor and the support arms to partially overcome the weight of the conveyor. However, such springs interfere with the movement of feed beneath the retaining walls and could become clogged with feed. The present invention overcomes this objection by utilizing helical tension springs having one end attached to a support arm and the other end attached to a retaining wall, the spring extending as the conveyor is lowered and exerting a force tending to raise the conveyor.

Accordingly, an object of the present invention is to provide suspension means for supporting a conveyor above a livestock feed bunk for vertical adjustment of the conveyor relative to the feed bunk floor in response to a longitudinal force applied to the conveyor.

Another object is to provide a livestock feed bunk including a conveyor and a conveyor feeding hopper carried by the conveyor adjacent to the end of the bunk.

Another object is to provide a device for imparting a longitudinal force to the conveyor for raising the conveyor in a longitudinal arc, wherein said device is positioned between the ends of the conveyor.

Another object is to provide such a device for manual operation and having a substantial mechanical advantage to facilitate the raising of the conveyor.

Another object is to provide improved spring means to partially overcome the weight of the conveyor to facilitate the raising of the conveyor.

Still another object is to provide such suspension means, spring means, and conveyor raising device of simple and rugged construction, simple and inexpensive to manufacture, operate, and maintain.

These and other objects and advantages of the invention will become apparent from the accompanying drawings and following description wherein the embodiment of the invention is described.

In the drawings:

FIG. 1 is a side elevation view of the hopper end portion of the livestock feeder with portions of the side boards and retaining walls removed, the conveyor being shown in a raised position.

FIG. 2 is the same view as FIG. 1, with the conveyor in a lowered position.

Figure 3:
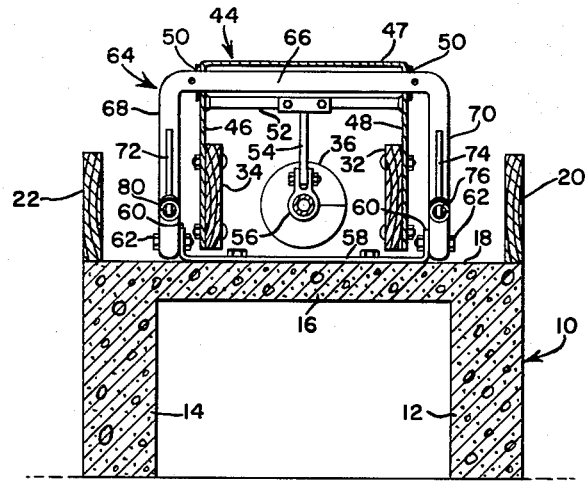
FIG. 3 is an enlarged sectional view taken along line 3—3 of FIG. 2.
Figure 4:
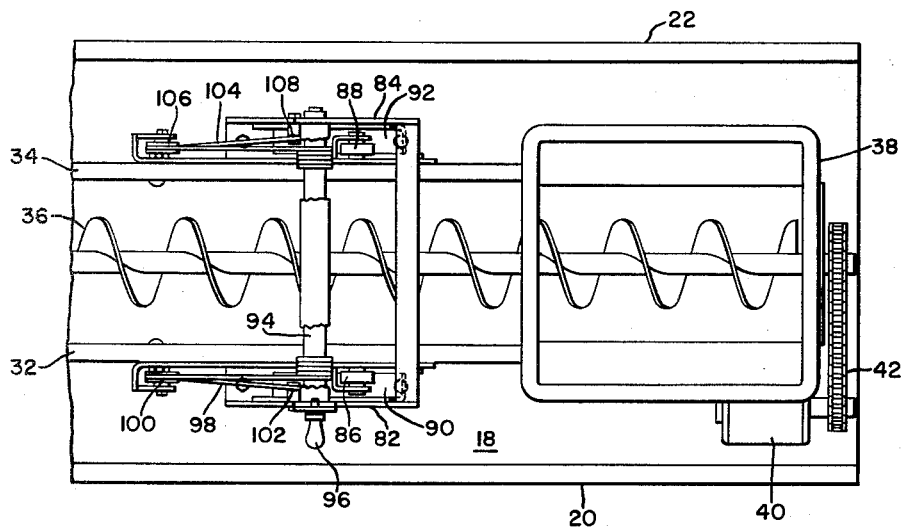
FIG. 4 is an enlarged top view of the hopper end portion of the livestock feeder including the hopper and the raising device.

Referring now to the drawings there is shown an elongated feed bunk 10 comprising opposite upright side walls 12 and 14 supporting a horizontal table portion 16 at their upper ends, the top surface of the table portion forming a floor 18 of the bunk. The bunk is usually made of concrete, although other materials can readily be used. Opposite side boards 20 and 22 extend vertically from the longitudinal edges of the floor 18, and form, in conjunction with the floor, a trough which retains the material for feeding the livestock.

A conveyor, indicated generally by the numeral 30, includes an auger 36 longitudinally disposed between opposite upright retaining walls 32 and 34, which extend the length of the bunk. A hopper 38 is supported by the retaining walls at one end of the conveyor for feeding the intake end of the auger 36. A motor 40 is also supported by the retaining wall 32 and drives the auger through drive means 42.

The retaining walls are carried by a plurality of longitudinally spaced inverted U-shaped suspension brackets 44 having a horizontal bight portion 47 and opposite leg portions 46 and 48, the retaining walls 32 being affixed to the leg portion 48 and the retaining wall 34 being affixed to the leg portion 46. The horizontal bight portion 47 extends transversely above the retaining walls. A transverse horizontal bore 50 extends through the upper portion of the opposite legs.

A horizontal support member 52 is fixed between each pair of opposite leg portions above the retaining walls, and below the bore 50. A vertical suspension member 54 depends from each horizontal support member and carries a journal 56 at its lower end in which the auger 36 is rotatably mounted.

A plurality of longitudinally spaced floor brackets 58 are affixed to the floor 18 at the same intervals as the suspension brackets, and have upwardly extending tabs 60 at opposite ends of each bracket carrying transverse coaxial pivots 62 which are longitudinally offset from the bores 50 toward the hopper end of the conveyor.

An inverted U-shaped support member 64 having a horizontal cylindrical bight portion 66 between parallel leg portions 68 and 70, is rockably mounted to each floor bracket 58, the ends of each leg portion being mounted to opposite pivots 62. The horizontal bight portion 66 is journaled in the bore 50. The leg portions 68 and 70 carry downwardly projecting tabs 72 and 74 respectively. A spring 76 having one end affixed to the tab 74 extends longitudinally away from the hopper end of the conveyor and is affixed to a bracket 78 carried by the retaining wall 32. Similarly, a spring 80 extends from the tab 72 to the retaining wall 34.

The support members 64 swing in longitudinal vertical arcs about the pivots 62, the conveyor being carried by the support members and raising and lowering in the same arc between the positions shown in FIG. 1 and FIG. 2 respectively. As is apparent from the drawings, the springs 76 and 80 extend as the conveyor is lowered, and exert a force tending to raise the conveyor.

Opposite upright support brackets 82 and 84 project vertically from the floor 18 on the outside of the retaining walls 32 and 34 adjacent to the outlet end of the hopper 38. Wheels 86 and 88 are carried by the retaining walls 32 and 34 respectively, and roll on arcuate tracks 90 and 92 respectively, said tracks being formed by the support brackets 82 and 84 respectively. As is apparent from the drawings, the tracks support the conveyor in any position in its arcuate movement.

A transverse horizontal shaft 94 has its opposite ends journaled in the support brackets 82 and 84 respectively, and is rotatable by crank handle 96, which carries stop means 97. A cable 98, windable around the shaft 94, is looped around a pulley 100 carried by the retaining wall 32 and affixed at 102 to the support bracket 82. Similarly, a cable 104 also windable around the shaft, is looped around the pulley 106 carried by the retaining wall 34 and affixed at 108 to the support bracket 84. By rotating the handle 96 and consequently the shaft 94, the cables are wound around the shaft and the conveyor is raised to the position shown in FIG. 1, the tension in the springs 76 and 80 helping to raise the conveyor. As is apparent from the drawings, the hopper is adjacent to the end of the bunk to facilitate the loading of the hopper. The conveyor is lowered to the position shown in FIG. 2 by releasing the stop means 97 and allowing the weight of the conveyor to unwind the cable and stretch the springs, the force exerted by the springs being slightly less than the gravitational force of the conveyor.

The conveyors are usually provided in sections approximately ten feet in length, the number of sections in any installation being variable to adapt the feeder to the requirements of the particular feed lot. The suspension brackets 44 and the support member 64 are generally spaced at the ends of each conveyor section, although only one section is shown in the accompanying drawings. The structure used to support the conveyor adjacent to the hopper, including the support brackets, wheels, and tracks, could also be utilized to support the conveyor along its entire length, replacing the support members 64 and the suspension brackets 44.

Other features and advantages of the present invention will occur to those skilled in the art, as will many modifications and alterations in the preferred embodiment of the invention as described herein, all of which may be achieved without departing from the spirit and scope of the invention.

What is claimed is:

1. In a material distributing device of the type having a longitudinally extending floor and a longitudinally extending conveyor vertically adjustably suspended above the floor on vertically swingable support members having their lower ends pivotally mounted on the floor, and suspension control means operatively connected to the conveyor for selectively raising or lowering the conveyor, means for partially counterbalancing the gravitational effect of said conveyor comprising a plurality of springs, each spring having one end affixed to a support member and the other end affixed to the conveyor.

2. The invention defined in claim 1 wherein said springs are helical tension springs which stretch as the conveyor is lowered, exerting a force tending to raise the conveyor.

3. In a material distributing device of the type having a longitudinally extending floor, a longitudinally extending conveyor disposed above the floor, suspension means for the conveyor including a plurality of longitudinally spaced inverted U-shaped support members having a horizontal bight portion and having depending leg portions on opposite sides of the conveyor pivotally mounted at their lower ends to said floor for movement of said leg portions in longitudinal vertical arcs about said pivots, the conveyor swingably depending from said horizontal bight portion, each pivot being longitudinally offset from the horizontal bight portion for raising or lowering the conveyor in response to a longitudinal force on said conveyor, and suspension control means for selectively raising or lowering the conveyor, the combination therewith of means for partially counterbalancing the weight of said conveyor comprising a plurality of springs, each spring having one end affixed to a leg portion of a support member and the opposite end affixed to the conveyor, said springs deflecting under the weight of the conveyor to allow the conveyor to seat on said floor and exerting a force tending to raise the conveyor.

4. In a material distributing device of the type having a longitudinally extending floor, a longitudinally extending conveyor disposed above the floor including an auger suspended between opposite upright longitudinally extending retaining walls, a plurality of longitudinally spaced inverted U-shaped support members having a horizontal bight portion and depending leg portions on opposite sides of the conveyor pivotally mounted at their lower ends of said floor for movement of said members in longitudinal vertical arcs about the pivots, the horizontal bight portions being journaled in depending suspension members which carry said retaining walls, each pair of floor pivots being longitudinally offset from each horizontal bight portion for raising or lowering the conveyor in said arc in response to a longitudinal force exerted on the conveyor, and suspension control means for selectively raising or lowering the conveyor, the combination therewith of means for partially counterbalancing the weight of the conveyor comprising a plurality of helical springs, each spring having one end affixed to the leg portion of a support member and the opposite end affixed to an adjacent retaining wall, said springs axially deflecting under the weight of the conveyor to allow the conveyor to seat on the floor, and exerting a gravity counteracting force tending to raise the conveyor less than the gravity force.

5. In a material distributing device of the type having a longitudinally extending supporting structure including a floor and a longitudinally extending conveyor vertically adjustably suspended above the floor by a plurality of support members for raising or lowering the conveyor in response to a longitudinal movement thereof, the combination therewith of suspension control means supported intermediate the conveyor ends and operatively connected to the conveyor for imparting longitudinal movement to said conveyor.

6. In a material distributing device of the type having a longitudinally extending supporting structure including a floor, a longitudinally extending conveyor vertically adjustably suspended above the floor by a plurality of longitudinally spaced support members and adapted to move vertically on the members in response to longitudinal movement of the conveyor, and a conveyor feeding hopper supported by the conveyor at the intake end of the conveyor, the combination therewith of suspension control means supported near the outlet end of the hopper and operatively connected to the conveyor for imparting longitudinal movement to the conveyor.

7. The invention defined in claim 6 wherein the suspension control means includes a pair of opposite upright support brackets extending from the floor on opposite sides of the conveyor adjacent the outlet end of the hopper, and at least one control member having one end operatively connected to a support bracket and the other end longitudinally offset and connected to the conveyor, the length of the control member being variable to impart longitudinal movement to the conveyor.

8. The invention defined in claim 7 and further characterized by a horizontal member having opposite ends attached to opposite support brackets above the conveyor.

9. The invention defined in claim 8 wherein the suspension control means includes winch means, the control member being a winch cable.

10. The invention defined in claim 9 wherein the winch means includes a drum having opposite ends journaled in opposite support brackets above the conveyor, and a pair of winch cables associated with the drum and connected to opposite sides of the conveyor.

11. The invention defined in claim 7 wherein each support bracket forms a vertically and longitudinally extending arcuate track conforming to the arcuate movement of the conveyor, and further characterized by a pair of rollers mounted on opposite sides of the conveyor for engaging the tracks and supporting the conveyor in any conveyor position.

12. A material distributing device comprising a longitudinally extending supporting structure including a floor, a plurality of support members having one end mounted on the floor, a longitudinally extending conveyor vertically adjustably suspended above the floor by said support members, a conveyor feeding hopper supported by the conveyor at the intake end of the conveyor, suspension control means supported intermediate the conveyor ends and operatively connected to the conveyor for selectively raising and lowering the conveyor, and a plurality of springs, each spring having one end affixed to a support member and the other end affixed to the conveyor, the springs deflecting under the weight of the conveyor to allow the conveyor to seat proximate the floor and exerting a force when deflected partially counterbalancing the weight of the conveyor.

13. A material distributing device comprising a longitudinally extending supporting structure including a floor, a plurality of horizontal pivots longitudinally spaced in coaxial pairs on said floor, a plurality of inverted U-shaped support members having a horizontal bight portion and depending leg portions, and having opposite ends rockably mounted on said pivot, a plurality of suspension members, each member swingably depending from the horizontal bight portion of a support member for movement in longitudinal vertical arcs, a pair of upright, opposed, longitudinally extending retaining walls carried by the lower portions of said suspension members, a longitudinally extending auger suspended between said retaining walls, means for driving said auger, an auger feeding hopper mounted on said retaining walls at the intake end of the auger, suspension control means operatively connected to the retaining walls for exerting a longitudinal force on the assembled auger, retaining walls, and hopper, causing them to raise and lower in a longitudinal vertical arc around said horizontal pivots, the control means being supported by the supporting structure intermediate the conveyor ends, and a plurality of springs, each spring having one end affixed to a depending leg portion and the other end to a retaining wall, said springs deflecting under the weight of the auger, retaining walls, and hopper to allow the retaining walls to seat proximate the floor, and exerting a force partially counterbalancing said weight.

14. The invention defined in claim 13 wherein the springs are helical tension springs having one end affixed to a depending leg portion of a support member and the other end affixed to the adjacent retaining wall.

15. The invention defined in claim 14 wherein the suspension control means includes a pair of opposite upright support brackets extending from the floor on the exterior sides of the retaining walls adjacent the hopper outlet, and at least one control member having one end operatively connected to a support bracket and the other end longitudinally offset and operatively connected to a retaining wall, the length of the control member being variable to impart longitudinal movement to the conveyor.

References Cited by the Examiner
UNITED STATES PATENTS
3,116,716   1/1964   Sime _____ 198—64

SAMUEL F. COLEMAN, *Primary Examiner.*